(12) United States Patent
Njølstad

(10) Patent No.: US 7,083,100 B2
(45) Date of Patent: Aug. 1, 2006

(54) DRAWING, WRITING AND POINTING DEVICE

(76) Inventor: Tormod Njølstad, Frode Rinnansvei 62, N-7050 Trondheim (NO)

( * ) Notice: Subject to any disclaimer, the term of this patent is extended or adjusted under 35 U.S.C. 154(b) by 114 days.

(21) Appl. No.: 10/363,530

(22) PCT Filed: Sep. 7, 2001

(86) PCT No.: PCT/NO01/00369

§ 371 (c)(1),
(2), (4) Date: Mar. 5, 2003

(87) PCT Pub. No.: WO02/27461

PCT Pub. Date: Apr. 4, 2002

(65) Prior Publication Data

US 2003/0178493 A1    Sep. 25, 2003

(30) Foreign Application Priority Data

Sep. 11, 2000   (NO) ................................. 20004514

(51) Int. Cl.
*G06K 7/10* (2006.01)
(52) U.S. Cl. ............................ 235/462.13; 235/462.01; 235/462.45
(58) Field of Classification Search ............ 235/462.13, 235/462.45, 472.01, 462.01, 472.02, 472.03
See application file for complete search history.

(56) References Cited

U.S. PATENT DOCUMENTS

| | | | |
|---|---|---|---|
| 5,227,622 A | 7/1993 | Suzuki | |
| 5,297,061 A | 3/1994 | Dementhon et al. | |
| 5,805,143 A | 9/1998 | Myers | |
| 5,945,981 A | 8/1999 | Paull et al. | |
| 6,263,799 B1 * | 7/2001 | Pardes | 104/28 |
| 6,290,134 B1 * | 9/2001 | Rando et al. | 235/472.01 |
| 6,390,370 B1 * | 5/2002 | Plesko | 235/462.49 |
| 6,446,871 B1 * | 9/2002 | Buckley et al. | 235/472.03 |
| 6,572,019 B1 * | 6/2003 | Rando et al. | 235/472.01 |
| 6,641,044 B1 * | 11/2003 | Plesko | 235/462.49 |

FOREIGN PATENT DOCUMENTS

WO        WO 00/23938 A1       4/2000

\* cited by examiner

*Primary Examiner*—Karl D. Frech
(74) *Attorney, Agent, or Firm*—Rothwell, Figg, Ernst & Manbeck, P.C.

(57) ABSTRACT

Drawing, writing or pointing device (1) for use with data presentations, computer supported work or other interactive use of a computer. The device (1) comprises one or more code patterns (3). Each code pattern (3) is adapted to be detected by a camera and recognition system (13). A camera and recognition system (13) adapted to cooperate with the device (1) records one or more images (31). At least one image contains one or more code patterns (3) from the device(s). Drawing, writing and pointing devices (1) are used in a system (40) and in a method for drawing, writing and pointing at data presentations, computer supported work and other interactive use of a computer where the position and orientation of the device (1) is determined and transferred to a computer. The drawing, writing and pointing device (1) is also used in a method for continuously recording the position and orientation of one or more marked objects, where the marking comprises one or more code patterns (3).

35 Claims, 13 Drawing Sheets

Figure 1:
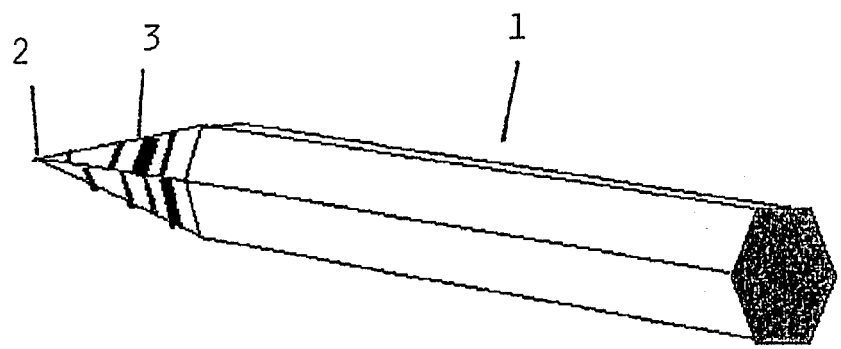

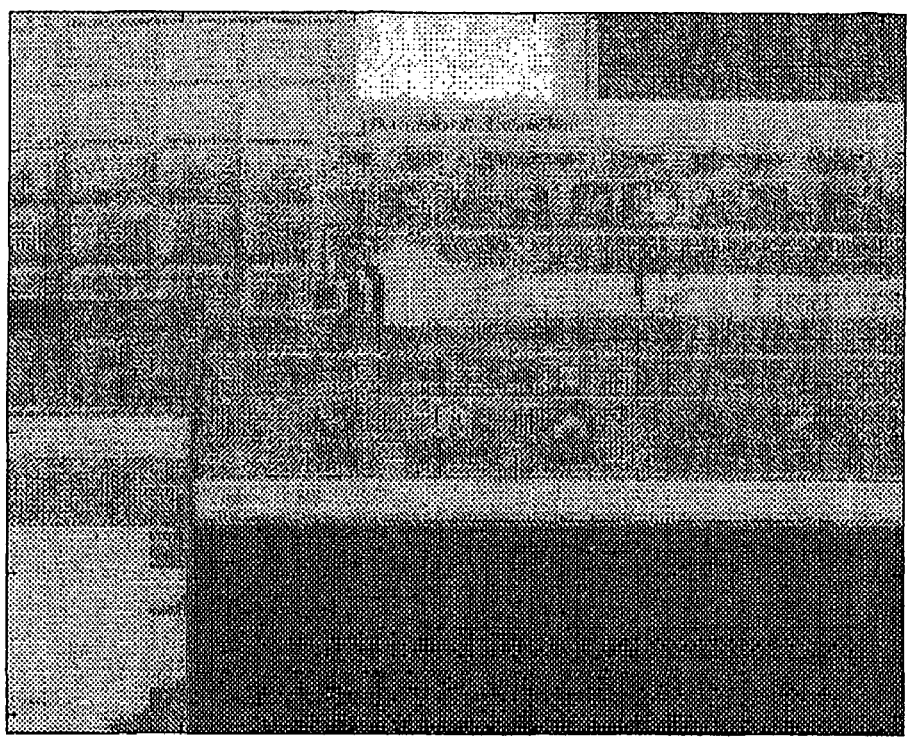
FIG. 4A
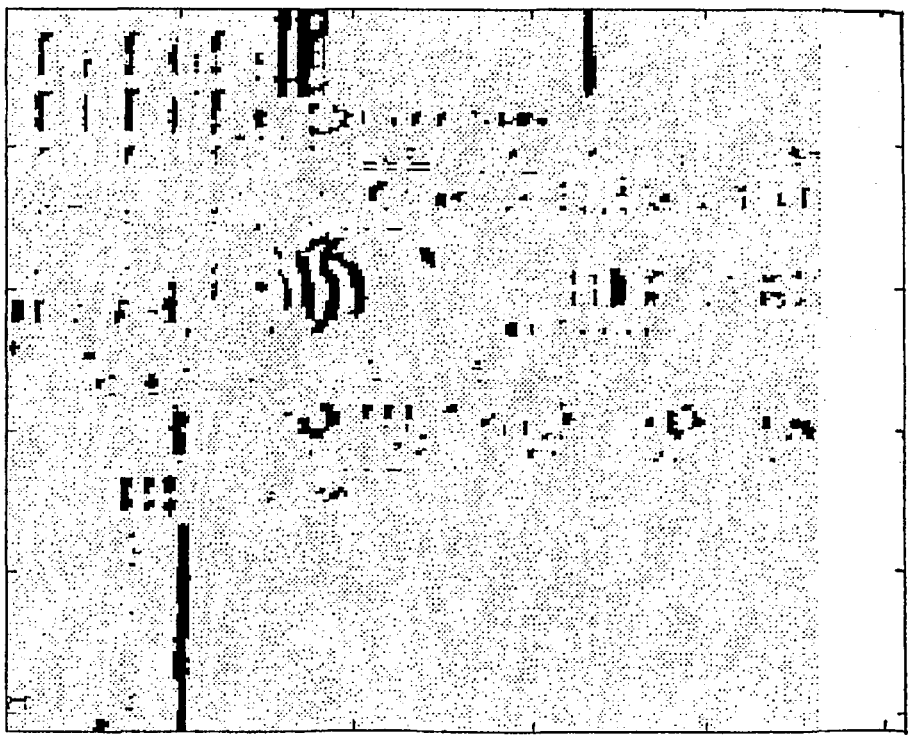
FIG. 4B                THRESHOLD VALUE 100

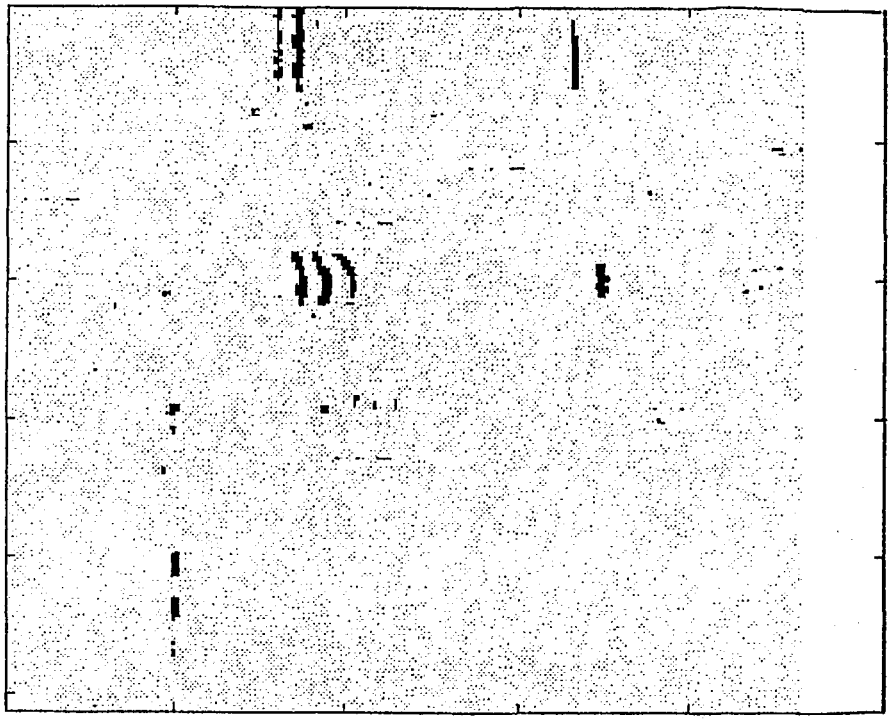
FIG. 4C    THRESHOLD VALUE 200
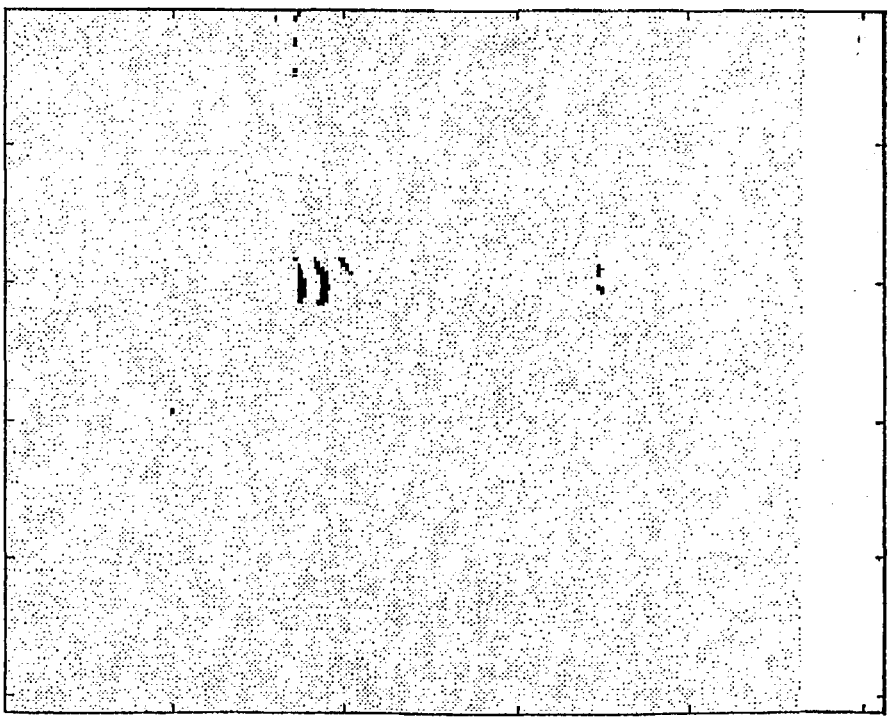
FIG. 4D    THRESHOLD VALUE 300

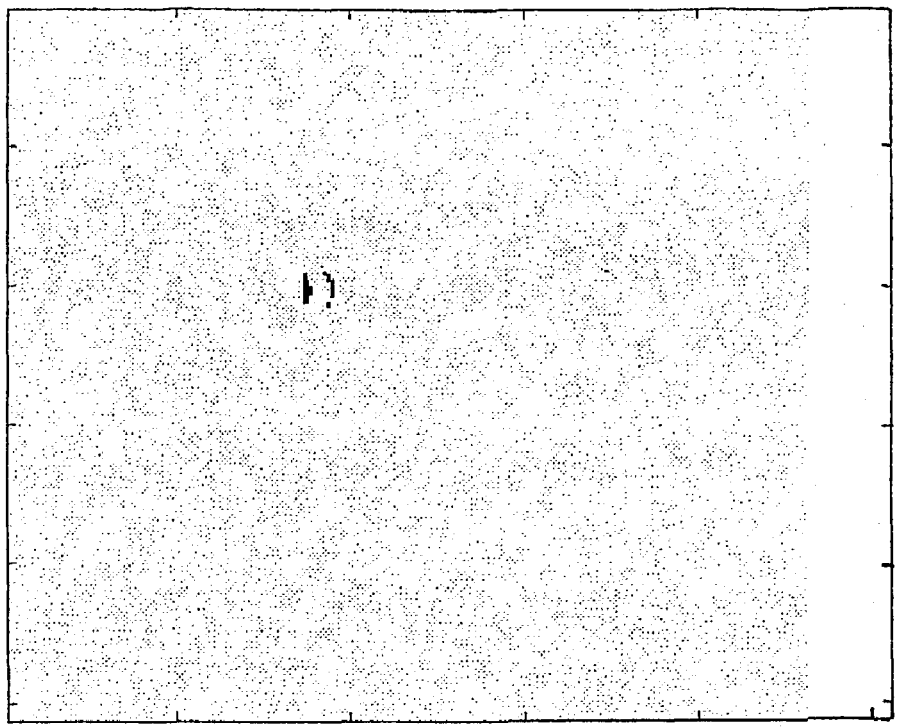
FIG. 4E        THRESHOLD VALUE 400
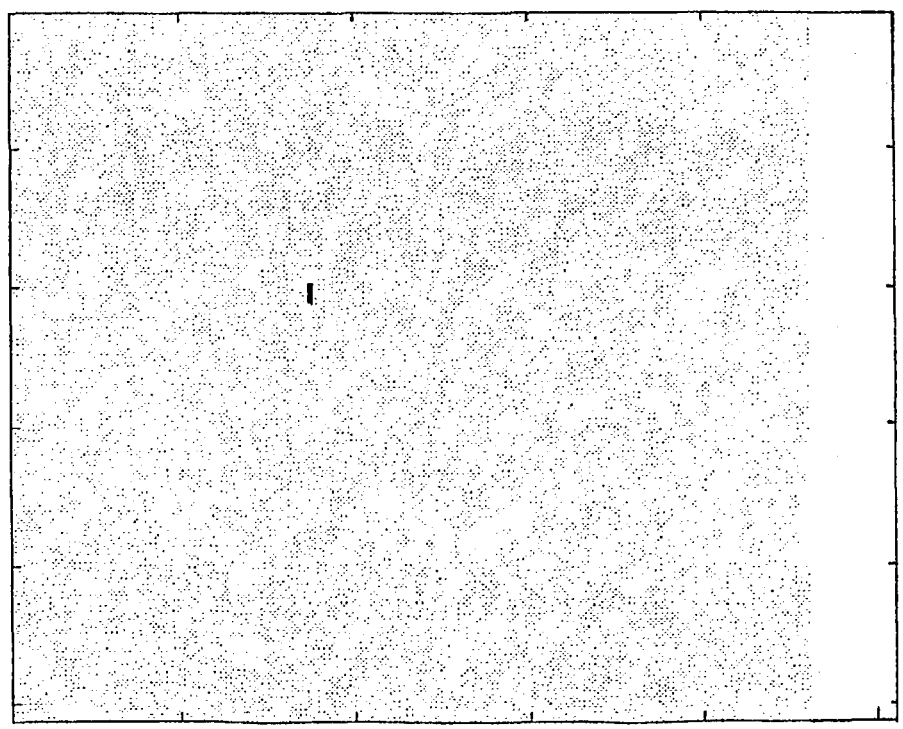
FIG. 4F        THRESHOLD VALUE 500

FIG. 4G					THRESHOLD VALUE 600
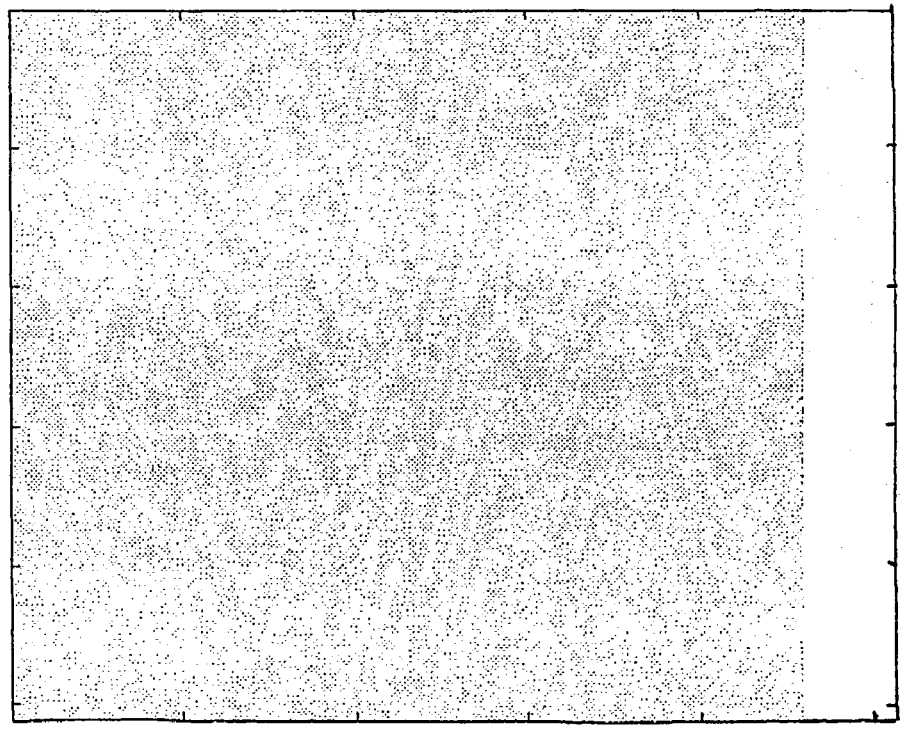
FIG. 4H					THRESHOLD VALUE 700

DRAWING, WRITING AND POINTING DEVICE

This invention relates to a drawing, writing and pointing device for data presentations, computer supported office work and/or other interactive use of a computer.

The invention is also related to a camera and recognition system for interaction with drawing, writing and pointing device for data presentations, computer supported office work and/or other interactive use of a computer.

The invention is further related to a system for drawing, writing and pointing which is suitable for data presentations, computer supported office work and/or other interactive use of a computer comprising a drawing, writing and pointing device, a camera and recognition system in addition to a computer system with a projection screen, a computer screen, a flat screen or a virtual screen.

The invention is also related to a method of drawing, writing or pointing at data presentations, computer supported office work or other interactive use of a computer, and a method of continuous detection of the position and orientation of one or a multiple of marked objects.

Today there are several known techniques of giving and supplying computer systems with information or control signals through interfaces. An ordinary computer mouse device, a joystick or trackball is used to supply input to computers. When using these, however, it is normally required that the user moves the device on a table or similarly while at the same time observing the result on a computer screen or presentation at a different place. The user often has to shift his attention from the control device and its position to the place of presentation. This may result in the user being unable to find a good and natural position. The computer mouse is perhaps not the ideal tool for handwriting or drawing graphics, images or figures. U.S. Pat. No. 5,805,143 shows a computer mouse with an adapter shaped like a pen in order to allow the user a more creative and free type of movement in order to draw, paint and design more easily than with a standard computer mouse device.

Other devices are known where the movement of pen-like units are followed by a camera or sensor system in order to supply input to a computer system. Examples of such are given in U.S. Pat. Nos. 5,297,061, 5,227,622, and 5,945,981. With all these the user has to move the steering or control device in one place while at the same time observing the result on a computer screen or presentation at another place. These can possibly be preferable solutions when working e.g. at a writing desk, but may be less preferable when making an overhead presentation in that the presenter easily looses his freedom of movement and may remain standing or sitting next to the computer or projector device.

It is further known to use touch sensitive displays where the user supplies input to a computer system by touching a computer display. Such a technique requires instrumentation of the display including a number of sensors, and such systems are for this reason not as mobile and flexible. They often have a limited resolution, and the system may require a lot of maintenance. A further limitation of such techniques is that the touching of the display itself may result in a gradual degradation of the quality of the image due to deposition of grease and dust and gradual damage to the surface.

Another known technique which is probably the prior art that is closest to the present invention is shown in WO 00/23938 where a camera system is used that is connected to a computer and directed towards at least part of an image which is being projected by a projector, a computer display device, or similar units. The camera is able to recognise at least one beam of light from a light source which is directed towards the displayed picture and forms a signal that is characteristic of the position and/or the trajectory of the movement or velocity and direction of movement of the position where the light beam hits the surface at which the image is presented. The beam of light from the light source may be supplied with characteristic features that are characteristic of the light source. The beam of light may e.g. be frequency-, amplitude- or phasemodulated. This solution may be well suited for a pointing device, but may not be equally well suited for a writing or drawing device in that it is not always as easy to obtain a natural writing or drawing movement of the position of the light beam.

Hence, it is an objective of the invention to provide a device that can be used as a drawing, writing as well as a pointing device for data presentations, computer supported work or other interactive use of a computer and which in its design enables a arbitrary user to use the device naturally, intuitively and ergonomically.

It is a further objective of the invention to provide a drawing, writing and pointing device with an associated camera and recognition system for interaction with the drawing, writing and pointing device for data presentations, computer supported office work and other interactive use of a computer.

It is another objective of the invention to provide a system for drawing, writing and pointing that is suitable for data presentations, computer supported office work and other interactive use of a computer comprising a drawing, writing and pointing device, a camera and recognition system as well as a computer system with a projection unit comprising a projection screen, a computer display, a flat screen or a virtual screen in which the user with high accuracy and in a simple and cost effective manner may draw, erase, write and point in a virtual screen updated by a computer.

It is yet another objective of the invention to provide a method of performing presentations at conferences, seminars, lectures and so on more flexibly by making it possible to point, draw by hand and write in the presentations with the same tool.

It is yet a further objective of the invention to provide a method of drawing, writing or pointing at data presentations, computer supported office work or other interactive use of a computer where one or more images are displayed on a computer display, a computer or video projection screen, a flat display or a virtual display and where recordings of the shown images are provided using a camera and recognition system.

It is yet another objective of the invention to provide a method of continuously recording the position and orientation of one or more marked objects in an area where image recordings are provided from the area using a camera and recognition system.

The drawing, writing and pointing device according to the invention is characterized in comprising one or more code patterns which can be detected by a camera and recognition system.

Preferred embodiments of the device are given in the dependent claims 2–11.

The camera and recognition system for interaction with the drawing, writing and pointing device according to the invention is characterized in that the camera records one or a multiple of images in which at least one of the images contains one or more code patterns from one or a multiple of drawing, writing or pointing devices.

Preferred embodiments of the camera and recognition system are given in the dependent claims 13–17.

The system for drawing, writing and pointing suitable for data presentations, computer supported office work and other interactive use of a computer is characterized in that the drawing, writing and pointing device comprises one or more code patterns which are detectable by the camera and recognition system, and in that the camera records one or more images, at least one of which contains one or more code patterns of one or more drawing, writing and pointing devices.

The method of drawing, writing or pointing related to data presentations, computer supported office work other interactive use of a computer is characterized in that the image recordings are processed using the camera and recognition system and/or software in the computer and/or projector in order that in each recorded image drawing, writing or pointing movements are registered in the form of changes of the position(s) and orientation(s) of the drawing, writing or pointing devices comprising one or more code patterns in front of the data or video projection screen, the flat screen or the virtual screen.

Further preferable embodiments of the method of drawing, writing or pointing are apparent from the dependent claims 24–26.

The method of continuously recording the position and orientation of one or more marked objects in an area is characterized in that the image recordings are processed using the camera and recognition system and/or software in the computer in order that in each image recording to record the position(s) and orientation(s) of one or more marked objects where the marking comprises one or more code patterns.

Further preferred embodiments of the method of continuously recording the position and orientation are apparent in the dependent claims 28–29.

Figure 2:
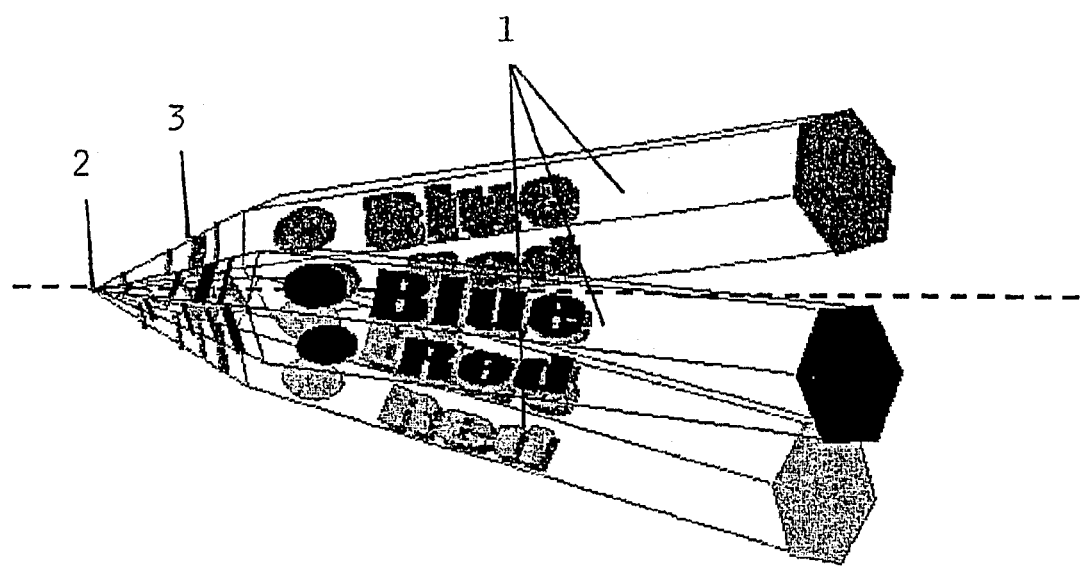
Figure 3:
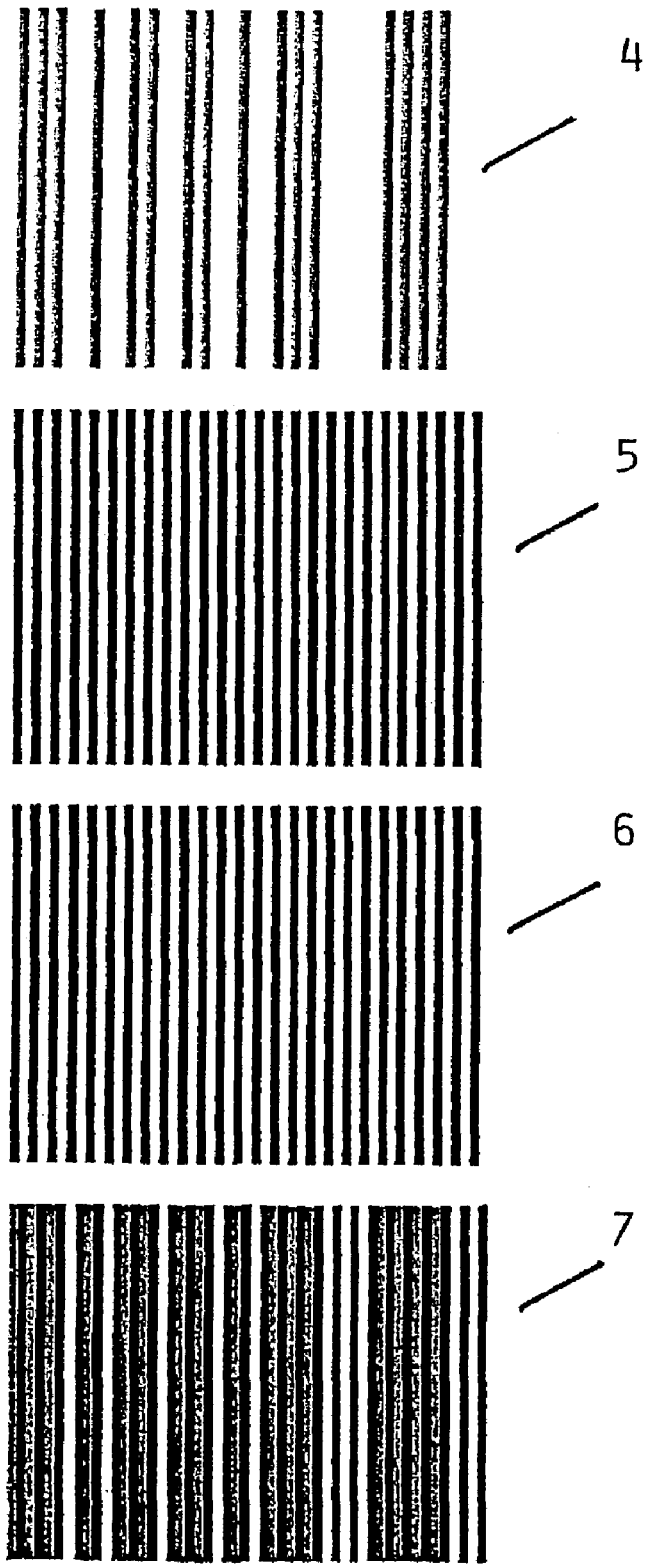
Figure 5:
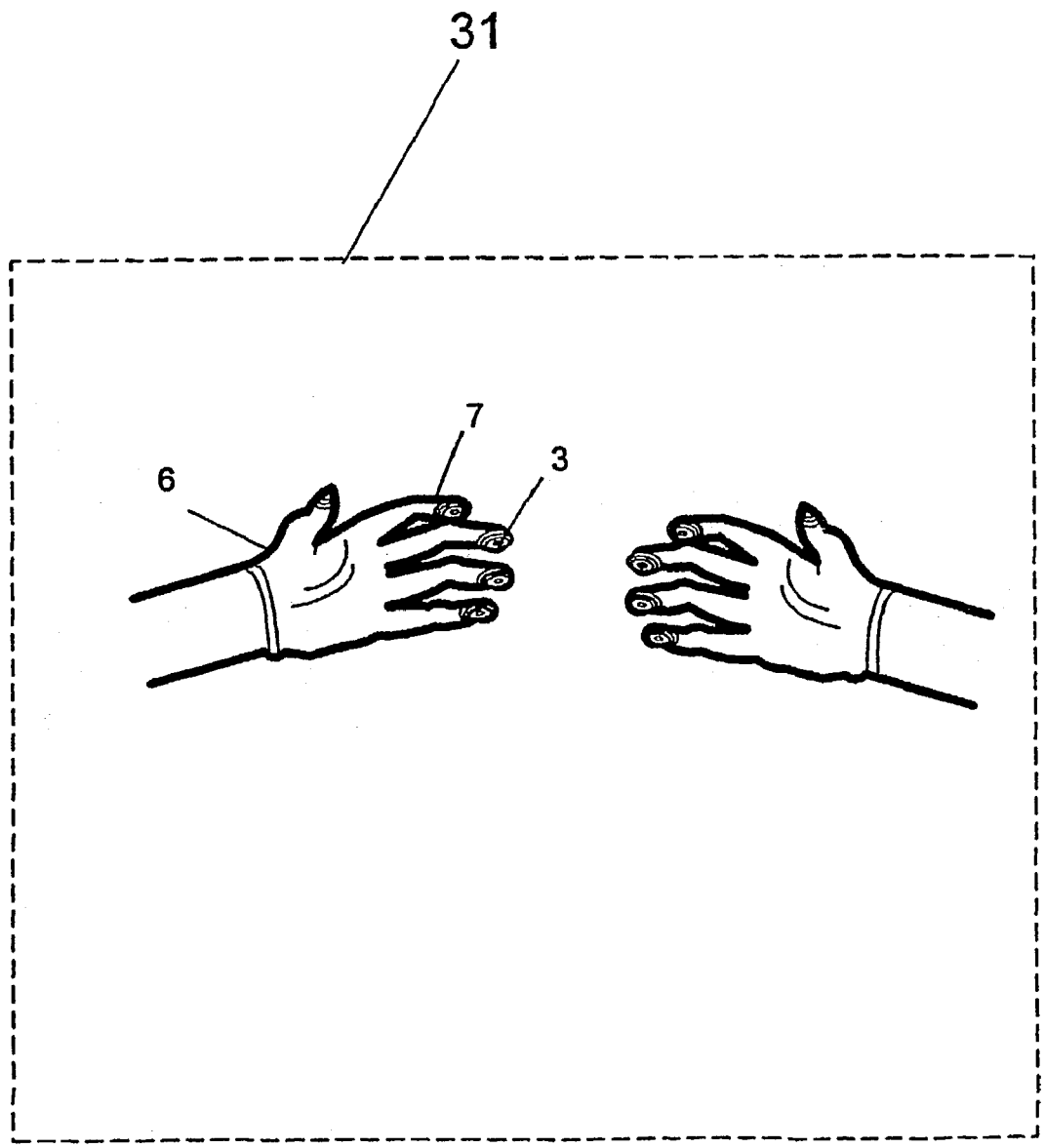
Figure 6A:
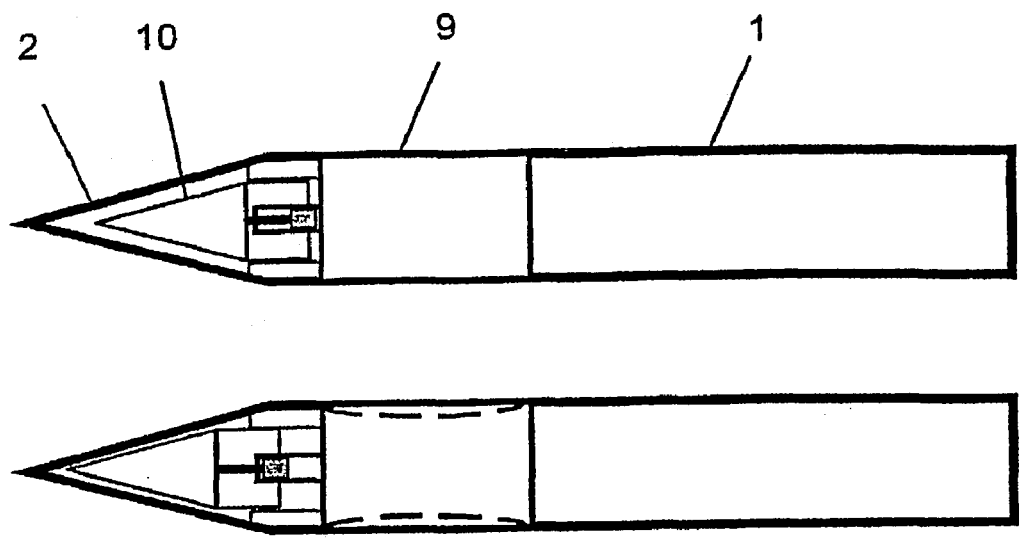
Figure 6B:
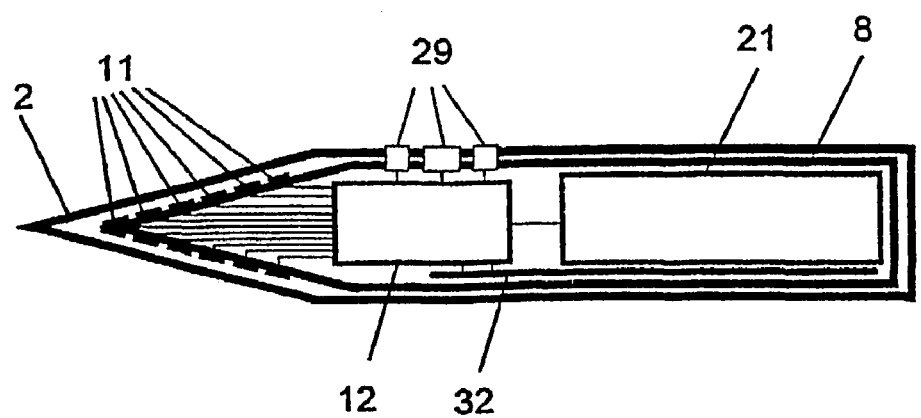
Figure 6C:
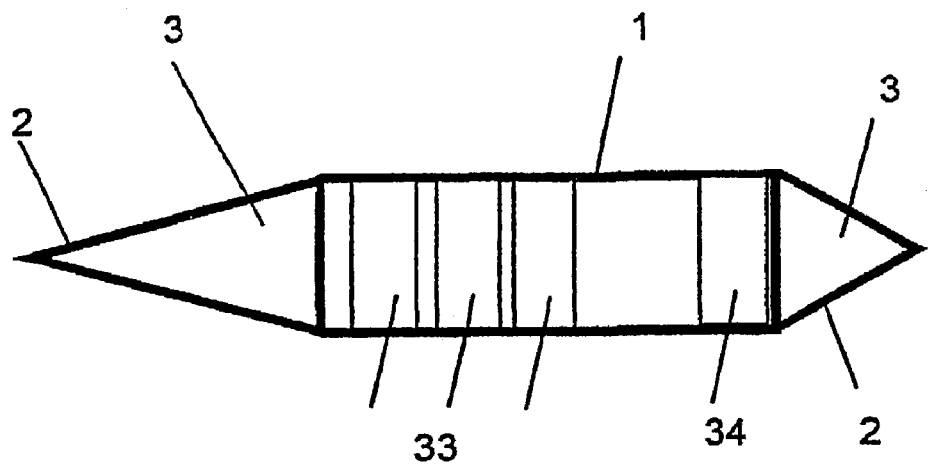
Figure 6D:
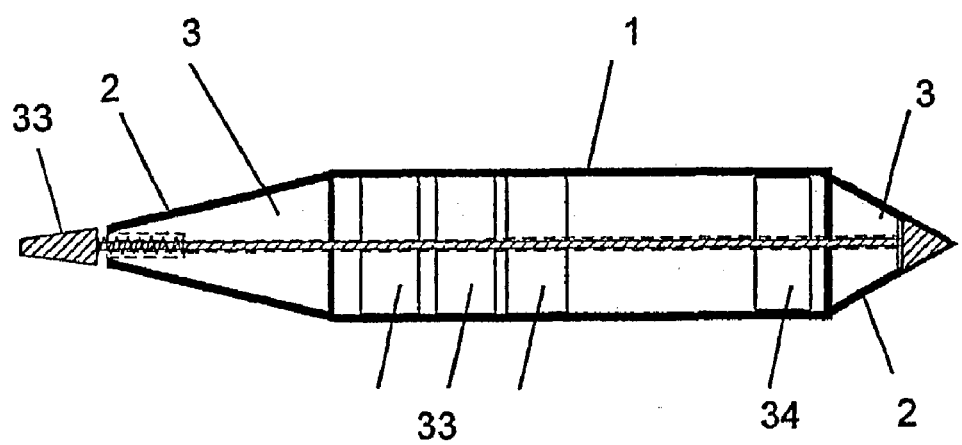
Figure 7:
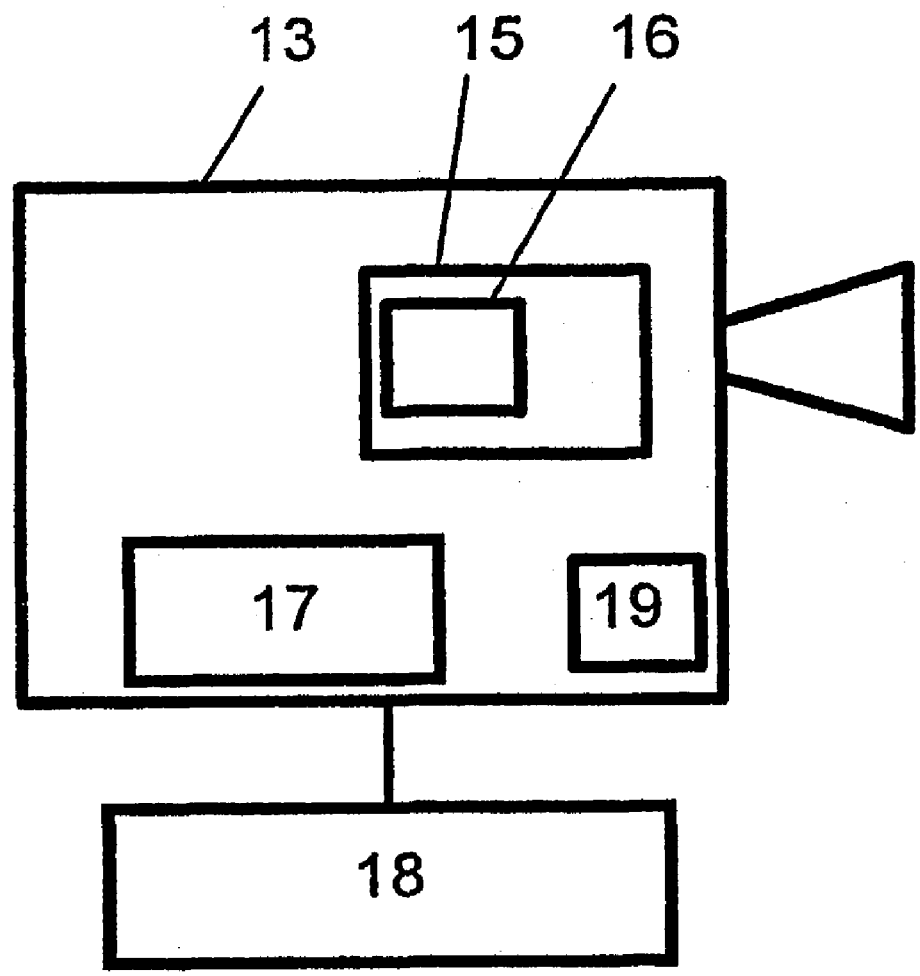
Figure 8:
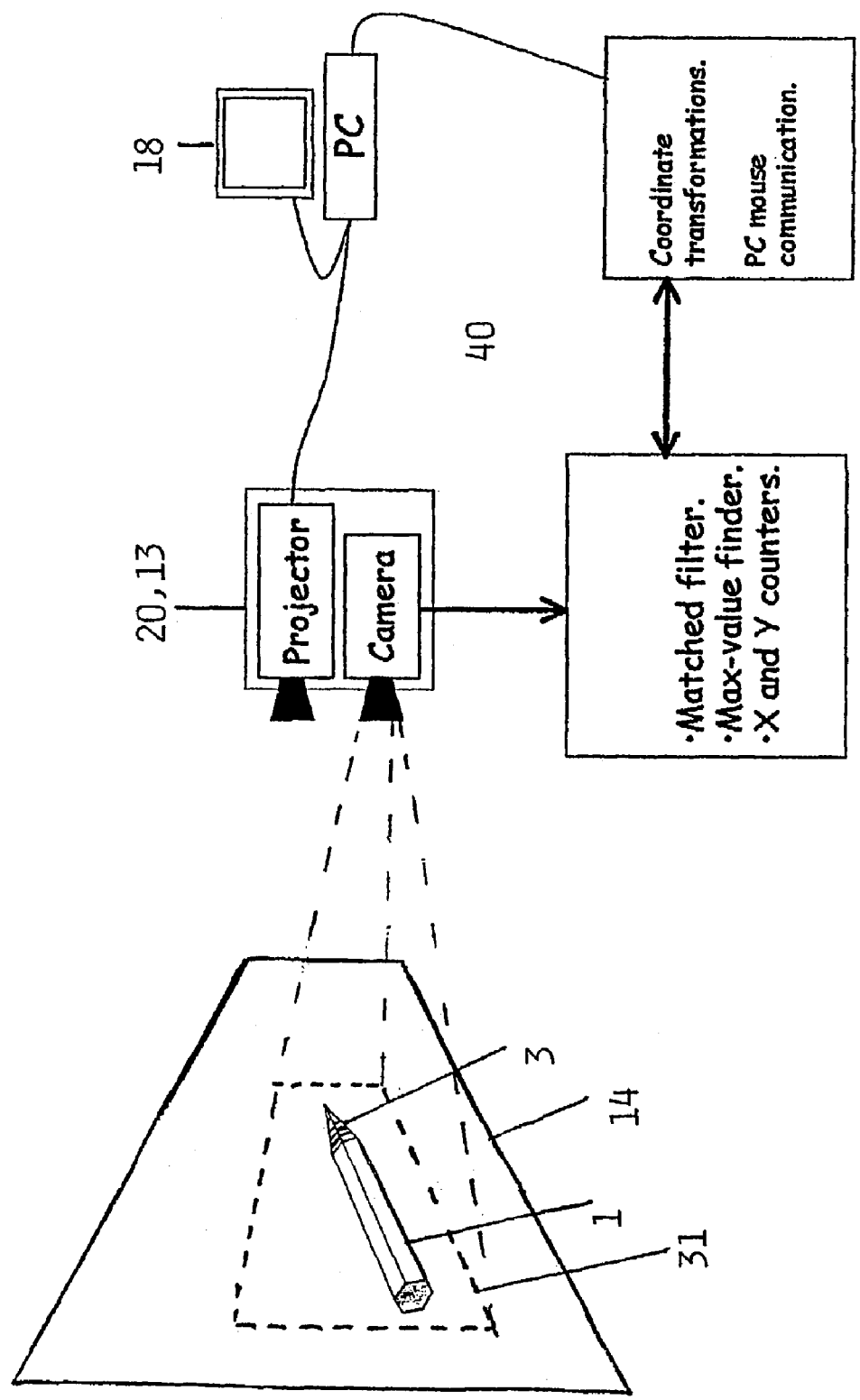
Figure 9:
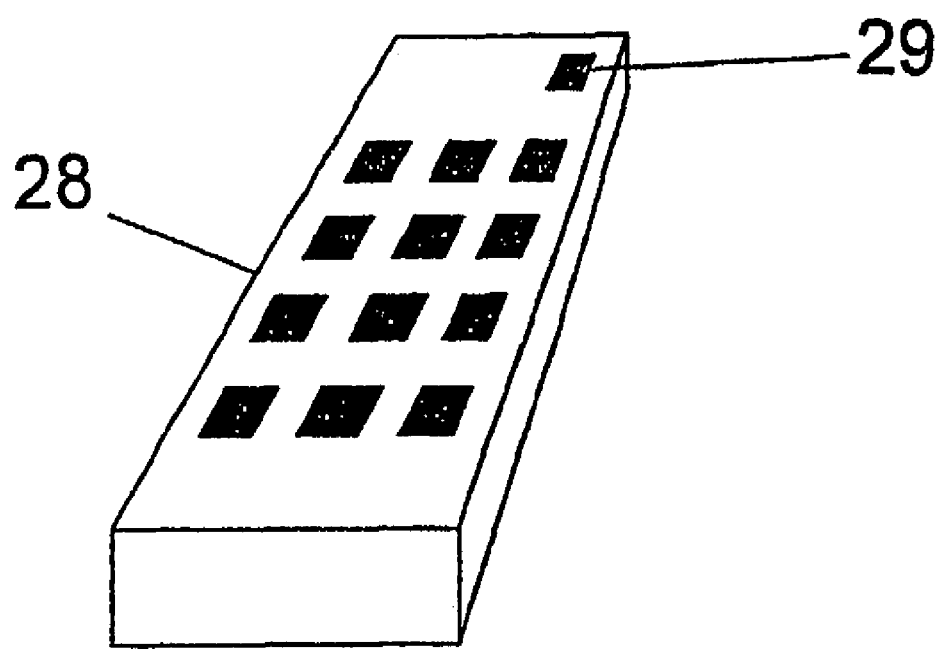

The invention will be explained in more detail in the following with reference to the accompanying drawings, where:

FIG. 1 Illustrates an embodiment of a drawing, writing and pointing device with code patterns, FIG. 2 Illustrates an embodiment of a drawing, writing and pointing device at different angles with respect to the horisontal plane, FIG. 3 Illustrates schematically code patterns, FIG. 4A Shows an example of an image recorded by the camera system showing a drawing, writing or pointing device, FIG. 4B–H Shows digitally filtered versions of the image in FIG. 4A with different threshold values, FIG. 5 Illustrates an embodiment of a pointing glove, FIG. 6A–D Illustrates four embodiments of a drawing, writing and pointing device including activation means, FIG. 7 Shows a diagram of the most important parts of the camera and recognition system, FIG. 8 Illustrates an embodiment of a system for drawing, writing and pointing suitable for data presentations and computer supported office work, and FIG. 9 Illustrates a remote control unit with an activation button.

Figure 10:
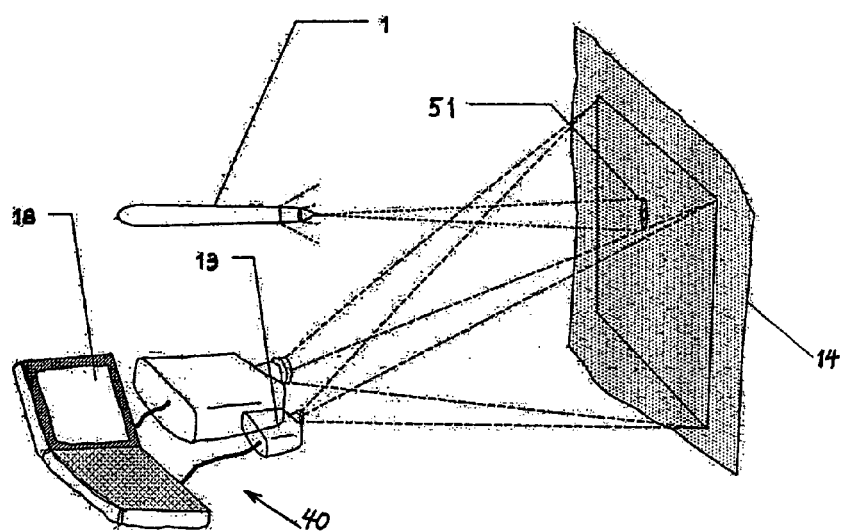

FIG. 10 Illustrates an alternate embodiment of the Invention.

In another embodiment as shown in FIG. 10. the device 1 may be adapted to project code pattern 11 on a projection screen 14. This may be achieved by using a light source and optical elements in the device 1. As to other elements in FIG. 10. these correspond to those shown in FIG. 8.

FIG. 1 illustrates an embodiment of the drawing, writing and pointing device 1 with an appearance and form as a pen, pencil, or table chalk. The drawing, writing and pointing device may in its simplest embodiments be produced at low cost.

The device 1 is equipped with one or more code patterns 3. The code pattern 3 may be placed at one or both ends of the device. With a code pattern on the tip of the device the position of the device can be determined in two dimensions. With several code patterns on the device it is possible to estimate the angles of orientation and the position in three dimensions of the device by additionally considering the size of the device and the sizes of the patterns. The angle of rotation of the device around its own axis may be recorded by placing different additional codes on the periphery of the device or on one of its tips. There may be code patterns 3 along the whole length of the device. This gives the possibility of a larger length of the code, which may improve detection. There may be several code patterns, giving the possibility of improved functionality. Long code patterns may be used to introduce redundancy, thereby reducing the possibility of wrong detection. In a preferred embodiment the code pattern 3 is placed on the tip of the device 2. The tip 2 may be triangular, conical, multifaceted or similarly shaped, in order to ensure that the device with the code pattern is easily visible even though the device is rotated to different angles, which is typical in natural writing and pointing movements.

The device 1 may be held by the user in a manner similar to writing with a pencil, felt pen or chalk. As the tip may be equipped with several code patterns, it will be possible to turn the device between the fingers, making the desired code pattern visible. The different code patterns may, for example, represent different colours (including background colour, eraser), different functions (pen, brush, chalk, spray, etc.) or different users/actors/contributors.

FIG. 2 illustrates how a device 1 may be turned at different angles while maintaining the tip 2 mainly in the same position. FIG. 2 also illustrates how the device may be turned around its longitudinal axis and thereby show different code patterns 3, where every single code pattern represents a colour.

During use, the code patterns may be masked off either by the user or in any other way. This may be used advantageously to signal the users chosen selections, commands or similar.

In another embodiment as shown in FIG. 10, the device 1 may be adapted to project code pattern 1451 on a projection screen 14. This may be achieved by using a light source and optical elements in the device 1. As to other elements in FIG. 10, these correspond to those shown in FIG. 8.

FIG. 5 illustrates a further embodiment of the device 1, where it comprises a pointing- and/or manipulation glove 6 comprising one or-more code patterns 3. FIG. 5 illustrates how two of these pointing gloves appears in an image recording 31. In a preferred embodiment the code patterns 3 will be placed on the fingertips 7, joints or knuckles of the glove, in such a way that the position of each finger may be detected and followed dynamically. Such an embodiment may be applied to influence a three-dimensional course of movement, or in order to control and manipulate interactively in any possible processes. The process may, for example, be a design process, or the control of intervention by the assistance of robots, or a more abstract multivariable process. Such a glove may also be used in order to interpret sign language, used for example by the deaf and partially hearing. In suitably adapted versions the device 1,6 may also be used to receive information from disabled people.

The code pattern may be activated in different ways. In one embodiment the device 1 comprises an activation mechanism/function such that the code pattern may be activated by the user of the device.

The activation mechanism/function 8 may, as illustrated in FIG. 6A, also comprise a compressible air chamber 9, which when compressed displaces an inner cylinder with a tip 10, such that the code pattern 3 on a partially transparent outer tip 2 obtains a contrast coloured background and such that the code pattern may easily be detected. In FIG. 6A the dotted line shows how compression of the air chamber 9 displaces the cylinder with tip 10 along its axis.

The activation mechanism/function 8 may also comprise an inner tip 10 and an outer cover 2 with different code patterns as illustrated in FIG. 3. Part A in FIG. 3 shows a code pattern 4 on an inner tip and Part B in FIG. 3 shows a stripe pattern 5 on an outer cover. The outer cover is displacable axially relative to the inner tip, for example between two different positions. In one position, prior to being displaced, the code pattern 4 placed on the inner tip 10 and a stripe pattern 5 on the outer cover 2 are aligned on top of each other, i.e. in register. When the code pattern 4 and the stripe pattern 5 are aligned, as illustrated in Part C of FIG. 3, the resulting appearing pattern 6 is similar to the stripe pattern 5. After displacement of the inner tip axially relative to the outer cover 2, for example half a stripe distance, to a second position, a third resulting pattern 7 appears, which is different from the code pattern 4 and the stripe pattern 5.

The activation mechanism/function 8 may also, as illustrated in FIG. 6B, comprise one or more infrared, light emitting diodes 11 with accompanying battery(ies) 21 where the activation using the control devices 29 causes the diodes 11 to form different code patterns on a partially transparent outer tip 2.

The activation mechanism/function 8 may also comprise means 12 for the modulation of the light emitting diodes 11 in order that the resulting modulated light signals contain additional information about e.g. pen type, colour, users or combinations of more of these characteristics.

The activation mechanism/function may alternatively comprise means for the transfer of radio signals. Such means may, for example, comprise a radio transmitter 12 with an antenna 32 able to transmit additional information about e.g. pen type, colour, users or combinations of more of these characteristics. A matching radio receiver 19 able to receive the signals from the radio transmitter may, for example, be a part of the camera and recognition system, to be described in more detail below. The transmission of radio signals may also comprise exchange of information in two directions.

In a device 1 with built-in electronics there may easily be included arrangements for the detection and recording of when the tip 2 is pressed against a surface, for example, using a pressure sensor or the like in the activation mechanism/function.

The activation function may however also be realised in a device 1 without electronics or mechanisms, by e.g. the user giving different activation signs by the fast left or right rotation of the device around its axis, by a fast increase of the angle of the device with the horisontal line beyond normal writing angles, by performing particular pen movements (such "strokes" are used to input commands in some computer software) or by the user masking individual code patterns with her fingers in order to give commands. FIG. 6C illustrates an example of such a device 1 with extra code patterns 33 that are placed in such a way that they may be masked easily by the user. An additional code pattern 34 is placed in such a way that it may be used to in the detection to determine left or right rotation of the device 1 around its axis, and in such a way signal and give information regarding the choices of the user.

The activation device 8 may also be adapted in order for the users to activate/control the code pattern 3 by movement, for example the pressing of a spring suspended tip 2 in one end of the activation device. The spring suspended tip 2 may comprise additional code patterns 33 and the tip may be mechanically coupled to a through-going centre pin in the device 1 such that the tip and the centre pin are displaced along the centre line of the device 1 and the effective stripe pattern in one end of the device is altered when the tip is pressed against a surface. The other end of the centre pin may also comprise a tip 2 with additional code patterns 33 such that the effective stripe pattern in the other end of the device also changes when the tip is pressed against a surface.

The activation mechanism/function may also, as illustrated in FIG. 9, comprise a control device in the form of a button 29 or similarly, which can be placed on a remote control unit 28, a keyboard or the like, that is being used together with the device 1, or may be placed on the device itself.

The camera and recognition system 13 according to the invention and for cooperation with the drawing, writing or pointing device 1 has a viewing field more than the whole, the whole or part of the projection screen, computer display or virtual display 14 and is adapted to record one or more images, wherein at least one of these contains one or more code patterns from one or more drawing, writing or pointing devices. An example of a typical image is shown in FIG. 4A, where a code pattern appears near the middle of the image.

If a drawing, pointing or writing device 1 is placed within the viewing field of the camera, it will, depending on how the device 1 is turned around its axis, appear with a code pattern which perhaps also may depend on the state of the activation mechanism/function.

The camera and recognition system 13 to be used together with the drawing, writing or pointing device 1 at data presentations, computer supported office work or any other interactive use of a computer is illustrated in FIG. 7. The camera of the system is adapted to record one or more images wherein at least one image contains one or more code patterns from one or more drawing, writing or pointing devices.

The camera and recognition system 13 typically is adapted to record an image of the computer display, the data or video projection screen, a flat display, or the virtual display with a set frame rate, typically 25–30 images per second or higher.

The camera and recognition system 13 comprises means for determining positions and for the determination of the position of the device 1 in one or more images 31. This may, for example, be realized by the filtering of each videoline in the images 31 in means for filtering 16 with one or more matched filters that are adapted to the individual code patterns, and thereby yields a maximum output value when a particular code patterns appears. With subsequent maximum value detection the positions of the devices 1 may be obtained. In FIGS. 4B-H the black fields in each image show the pixels where the output of an adapted FIR-filter (Finite Impulse Response) are above a certain threshold value. The filter coefficients in this example in FIG. 4 are [1,1,1,−1,−1,−1,−1,−1,−1,1,1,1,1,−1,−1,−1,1,1,1,1] and the threshold values are in A) 100, B) 200, C) 300, D) 400, E) 500, F) 600 og G) 700.

Preferable code patterns are those which have a low autocorrelation (low concurrence between code patterns of a left- or rightways displaced version of the code pattern) and low cross correlation (low concurrence between one code pattern and another code pattern, or a displaced version of this).

The choice of such code patterns or sequences with good statistical characteristics are described by comprehensive theory and applications within telecommunications, and the selection of code patterns is not intended to be part of this invention. The method is, however, validated by using examples of code patterns which yields very good results, as for example illustrated in FIG. 4.

The camera and recognition system of the invention may for example be based on single-chip CMOS camera technology from Photobit, Kodak, etc., thus yielding fairly cost effective solutions, but also complete systems integrated in one silicon chip are possible in the low cost CMOS technology available today.

As every line in the video image is analyzed/filtered separately the hardware (i.e. the electronics) is relatively simple. The design of the tip 2 ensures that the device 1 may be held in different ways and at different angles without reducing the accuracy of the detection of the position of the tip position, as there will always be one videoline which cuts through this, and thus contains the whole code pattern, see FIG. 2. When selecting other code patterns for the tip of the device, the filtering of a selected area of image points, not only those along one line at a time, may be of interest.

The camera and recognition system 13 may also comprise means 17 for transmitting data by transmitting signals to a computer 18 The transmitted signals typically comprises information regarding the position of the device. Most preferably, the signals will be in standard format of input data to computers, as for example signals from a computer mouse device.

One or more drawing, writing or pointing devices 1 according to the invention and a camera and recognition system 13 according to the invention may form, together with a computer system 18,20 with a display unit 20 comprising a projection screen, a computer display, a flat screen or a virtual display 14, form a system 40 for drawing, writing and pointing at data presentations or computer supported office work. Such a system 40 would be characteristic in that the drawing, writing or pointing device(s) 1 comprises one or more code patterns 3 detectable by a camera and recognition system 13, and in that the camera records one or more images 31 at least one of which containing one or more code patterns 3 from one or more drawing, writing and/or pointing devices 1,6 and in that the camera and recognition system by filtering of the images and subsequent maximum value detection finds the position and orientation of the device(s), and in that this information subsequently may be transferred to a computer.

In a preferable embodiment of the invention a camera and recognition system 13 is built into a computer projection unit 20 and adapted such that the projection screen 14 is within the viewing field 31 of the camera 13. In a preferable embodiment the camera and recognition system 13 is adapted to form position determining signals similar to those produced by a typical computer mouse device, and to transfer the position determining signals to a computer. In this manner all computer programs which make use of a computer mouse device may use the drawing, writing and pointing device according to the invention.

The camera and recognition system 13 will in a preferable embodiment typically comprise detection electronics and/or software adapted to send information directly to a computer, or which may be integrated in the computer itself. The information may typically describe how the drawing, writing and pointing device is moving, e.g. in a manner similar to the information being transmitted from a computer mouse device. This means that the system in principle may be used with all computer programs which today make use of a computer mouse device. A data storage unit, which for example may be a part of the computer 18 or the camera and recognition system 13, could be adapted to store the registered positions and orientations of the drawing, writing or pointing device(s). The computer 18 or the camera and recognition system typically comprises software for processing the recorded images. Such software may for example also be adapted to determine how and which images are to be presented. This may be made to depend on the positions and orientations of the drawing, writing or pointing device(s).

By using several image recordings with corresponding positions and orientations of the device(s), the direction of movement and velocity of movement of the devices can also be calculated and used to control the presentation of images or to give commands, input data or similarly to the computer or other parts of the system.

The shape of the device 1 ensures that an arbitrary user may use it naturally, intuitively and ergonomically to write in his own handwriting, to draw accurately and to point at a computer/video projection screen, such that a computer easily may receive, store, reproduce and process such handwriting, such drawings and perform commands and operations according to such pointing movements.

The invention makes it possible with great accuracy and in a cost effective manner to draw, erase, write, and point in a virtual screen being updated by a computer.

Technology for automatic analysis of handwriting may, if desired, be used to obtain further user benefits, functionality as well as individual adaptation to the system.

Data presentations (with PowerPoint etc.) are increasingly made at conferences, seminars and lectures and in development work. The invention enables a way of performing such presentations in a more flexible manner in that pointing, drawing and writing by free-hand can be performed using the same tool.

It may also be envisaged that the invention could be a part in future generations of projection screens and computers in order to give improved possibilities of use and improved user friendliness in interactive work.

In the above it is described how the position of the drawing, writing or pointing device 1 with code patterns 3 may be determined using a camera and recognition system 13.

The camera and recognition system 13 may, however, be used to determine the position of other objects than the drawing, writing and pointing devices. Hence, the camera and recognition system will make it possible to continuously record the position and orientation of one or more marked objects in an area. This can be achieved in that a camera and recognition system provides image recordings from the area and simultaneously processes the recorded images, if necessary using a built-in computer with corresponding software, in order that in each recorded image to determine the position(s) and orientation(s) of one or marked objects where the marking comprises one or more code patterns 3. The computer with corresponding software may also be adapted as a unit separated from the camera and recognition system itself with suitable means for transferring signals between these. In a preferable embodiment the processing of the recorded images may also comprise storage of the determined positions and orientations of one or more marked objects comprising one or more code patterns in a data storage unit. Furthermore, the processing of the recorded images preferably comprises using a multiple of determined positions and orientations of the marked objects, based on a multiple of recorded images, further to determine the direction and/or velocity of movement of the marked objects. Additionally, the processing of the recorded images may preferably comprise changing the behaviour or execution of the computer programs depending on the determined positions, orientations, directions and/or velocities of movement of the marked objects.

The invention claimed is:

1. Drawing, writing or pointing device (1) for data presentations, computer supported work or other interactive use of a computer,
characterized in that the device (1) exhibits one or more code patterns (3) adapted to be remotely detected by a camera and recognition system.

2. Device according to claim 1, wherein the device (1) comprises one or two ends (2) with code patterns (3).

3. Device according to claim 1, designed as a pointing glove (6) adapted to be placed on one or more fingers or a hand.

4. Device according to claim 3, wherein the code patterns (3) are placed on the fingertips (7), joints or knuckles of the pointing glove (6).

5. Device according to claim 1, wherein one or both ends of the device has a triangular, conical or fasetted pointed end (2) comprising code patterns (3) in order to ensure continuous detection of the code pattern and the position and orientation of the device.

6. Device according to claim 1, comprising an activation mechanism/device (8) such that the code patterns (3) may be activated/controlled by the user of the device.

7. Device according to claim 6, where the activation mechanism/device (8) activates additional code patterns (33) partially maskable by the user and/or additional code patterns (34) which may be used to determine left or right rotation of the device (1) around its own axis, in order to signal and activate the selection made by the user.

8. Device according to claim 6, where the activation mechanism/device (8) comprises a control device (29) placed on a remote control unit (28), on a keyboard of a computer (18) or on the device (1) itself.

9. Device according to claim 6, where the activation mechanism/device (8) comprises a compressible air chamber (9) which upon compression displaces an inner cylinder with a tip (10), such that the code pattern (3) on a partially transparent outer tip (2) obtains a contrast coloured background for easier detection.

10. Device according to claim 6, where the activation mechanism/device (8) comprises an inner tip (10) and an outer cover (2) axially displacable relative to each other upon activation, and that the code pattern (4) on the inner tip and a stripe pattern (5) on the outer cover in an initial position are aligned right above each other, forming a resulting code pattern (6), and where upon displacement of the inner tip or the outer cover, another resulting code pattern (7) appears.

11. Device according to claim 6 where one end of the activation mechanism/device comprises a spring suspended tip with additional code patterns (33), the tip being mechanically coupled to a through-going centre pin of the device such that the tip and the centre pin are displaced along the centre line of the device (1) and that the effective stripe pattern in one end of the device is altered when the tip is pressed towards a surface.

12. Device according to claim 11, wherein the other end of the centre pin comprises a tip with additional code patterns (33) 50 that the effective stripe pattern in the other end of the device (1) is altered when the tip is pressed against a surface.

13. Device according to claim 6 where the activation mechanism/device (8) comprises at least one infrared light emitting diode (11) arranged individually or in one or more rows, with corresponding battery (21), where the at least one diode upon activation causes different patterns to appear on the partially transparent outer tip (2).

14. Device according, to claim 13 comprising also means (12) for modulating the infrared light, so that the resulting modulated light contains information regarding pen type, colour, user or other similar information or a combination of more of these characteristics so that the desired function and user may be identified.

15. Device according to claim 6 where the activation mechanism/function (8) comprises means (12,32,19) for transferring radio signals adapted to exchange information.

16. Camera and recognition system (13) for cooperation with at least one drawing, writing or pointing device (1) at data presentations, computer supported office work or other interactive use of a computer according to claim 1,
characterized in that the camera is adapted to record one or more images (31) wherein at least one image contains one or more code patterns (3) from said at least one drawing, writing or pointing device (1).

17. System according to claim 16, comprising position determining means (15) for the determination of the position of the devices (1) in one or more images (31).

18. System according to claim 17 where the position determining means (15) comprises filtering means (16) for the filtering of the points in the images (31).

19. System according to claim 17 where the position determining means (15) comprises filtering means (16) for filtering of horisontal lines in the images (31).

20. System according to claim 16, where the filtering means (16) comprises filters, preferably matched filters, adapted to the code patterns (3), and subsequent maximum value detection, thereby identifying the positions or orientations of the patterns (3) of the device (1).

21. System according to claim 16, comprising data transferring means (17) for transferring signals to a computer (18) in that the signals comprise information regarding the position or orientation of the at least one device.

22. System according to claim 21, where the signals are in a standard format of input data to a computer, in particular such as from a computer mouse device.

23. Device according to claim 1,
comprising means for generating projected code patterns on a screen using a light source and optical elements.

24. Method of drawing, writing or pointing at data presentations, computer supported office work or other interactive use of a computer comprising the following steps:
displaying one or more images (31) on a computer screen, a data or video projection screen, a flat screen or a virtual screen (14) using a computer (18,20) or projector (20);
providing image recordings of the displayed images using a camera and recognition system (13)
characterized in the further steps of
processing the images recorded using the camera and recognition system (13) or software in the computer (18,20) or the projector (20) in order for in each recorded image to record drawing, writing or pointing movements in the form of changes in the position or orientation of drawing, writing or pointing devices (1,6) comprising one or more code patterns (3) in front of the computer/video projection screen, flat screen, or the virtual screen.

25. Method according to claim 24,
characterized in that the processing of the images further comprises
storing the recorded positions and orientations of the drawing, writing and pointing devices in a data storage unit.

26. Method according to claim 24, characterized in that the processing of the recorded images further comprises
altering the displayed images depending on the recorded positions and orientations of the drawing, writing or pointing devices.

27. Method according to claim 26,
characterized in that the processing of the recorded images further comprises
altering the appearance or execution of the program in the computer depending on one or more of; the recorded positions, orientations, directions of movement or velocities of movement of the devices (1,6).

28. Method according to claim 24, characterized in that the processing of the recorded images further comprises
using a multiple of determined positions or orientations of the devices (1,6), based on a multiple of recorded images, for the further determination of the direction or velocity of movement of the devices (1,6).

29. Method for continuously recording the position and orientation of one or more marked objects in an area comprising the following steps:
providing recorded images of the area with said one or more marked objects using a camera and recognition system (13) such that said image contains information related to the mark on said marked objects
characterized in the further steps of
processing the recorded images of said area using the camera and recognition system (13) or software in the computer (18,20), a part of said image being formed by said one or more marked objects in the area in order to in each image to record the position or orientation of one or more marked objects, the marking comprising one or more code patterns.

30. Method according to claim 29,
characterized in that the processing of the recorded images further comprises
storing the recorded positions and orientations of one or more marked objects where the marking comprises one or more code patterns in a data storage unit.

31. Method according to claim 30, characterized in that the processing of the recorded images further comprises
altering the appearance or execution of the program in the computer depending on one or more of; the recorded positions, orientations, directions of movement or velocities of movement of the marked objects.

32. Method according to claim 29,
characterized in that the processing of the images further comprises
using a multiple of recorded positions and orientations of the marked objects, based on a multiple of recorded images, for the further calculation of the direction or velocity of movement of the marked objects.

33. Method according to claim 29,
comprising generating projected code patterns on a screen using a light source and optical elements.

34. System for drawing, writing and pointing suitable for data presentations and computer supported office work comprising
drawing, writing or pointing devices (1),
camera and recognition devices (13),
computer devices (18,20) with display units (20) comprising at least one projection screen, computer display, flat screen or virtual screen (14)
characterized in that
the camera (13) is adapted to record one or more images (31) in which at least one image contains one or more code patterns from at least one drawing, writing or pointing device (1,6),
the tip (2) of the at least one drawing, writing or pointing device (1,6) comprising one or more, code patterns (3) which are detectable and whose position(s) can be determined by the camera and recognition system (13), and that position determining information is transferred continuously to the computer devices (18,20) 50 that one or more users may draw, write or point at the projection unit (20) in replacement of computer mouse devices.

35. System according to claim 34,
comprising means for generating projected code patterns on a screen using a light source and optical elements.

* * * * *